Dec. 6, 1938.   R. D. HUTCHENS   2,138,922
FREQUENCY CHECKING DEVICE
Filed Oct. 6, 1936
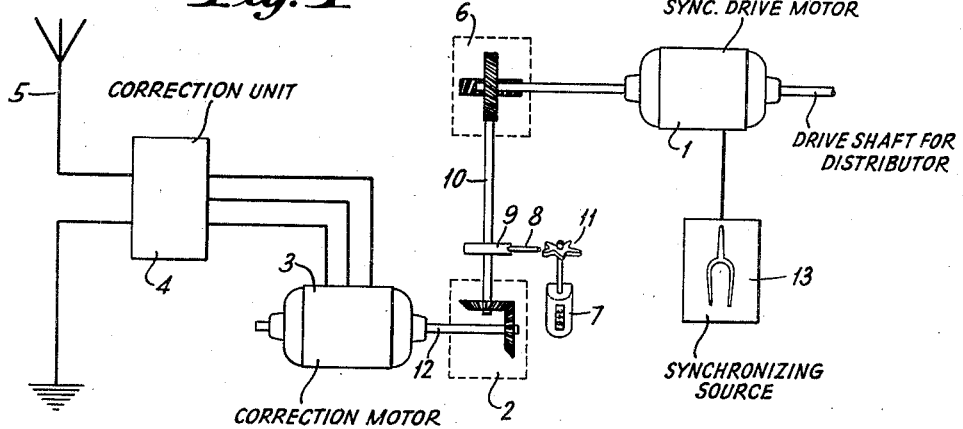
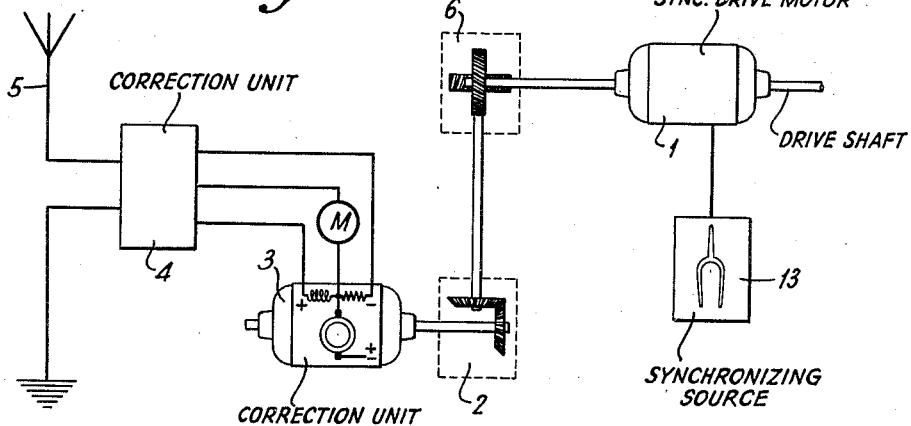
INVENTOR
RAYMOND D. HUTCHENS
BY
ATTORNEY Patented Dec. 6, 1938

2,138,922

UNITED STATES PATENT OFFICE 2,138,922

FREQUENCY CHECKING DEVICE

Raymond D. Hutchens, Chicago, Ill., assignor to Radio Corporation of America, a corporation of Delaware Application October 6, 1936, Serial No. 104,175

8 Claims. (Cl. 178—69.5)

This invention relates to synchronously operated apparatus, and more particularly to such apparatus in a telegraph communication system wherein it is desired to accurately synchronize the rotating mechanism at a receiver in accordance with the rotating mechanism at a remotely located transmitter.

Although the present invention finds particular application to a telegraph communication system wherein the steep slopes of the received message waves are utilized to control a correction mechanism at the driving motor, and will be explained in connection with such a system, it is to be distinctly understood that the invention is not limited thereto but may be employed in other circuit arrangements.

In a telegraph system wherein the slope or wave front of the received signals controls the correction mechanism for a drive motor, as instanced, for example, by a circuit arrangement described in United States Patent No. 2,010,505, granted August 6, 1935, to John L. Callahan et al., it has been heretofore necessary, whenever it was desired to determine the speed discrepancies between the rotating drive motors at transmitting and receiving stations and compare the rates of vibration of the two synchronizing forks, to interrupt the transmission of traffic between the two stations and send predetermined test signals for a period of time sufficient to measure, at the receiver, the drift between the incoming signal and the receiving commutator which is connected to the shaft of the drive motor, and from the measured drift compute the departure in speed of the drive motor at the receiver from the speed of the motor at the transmitting station, and hence, the deviation of the receiving fork from the standard set by the transmitting fork.

One of the objects of the present invention is to enable the measurement or calculation of the drift in speed between the rotating mechanisms at the transmitter and receiver without interrupting the commercial traffic between the two stations.

Another object is to provide a device which will indicate the relative speed discrepancies between the synchronizing source of a transmitting station and the synchronizing source of a local receiving station. This synchronizing source is usually a fork, the rate of vibration of which is held constant between rather wide limits so that it may be used to establish a time standard at each station.

Features of the invention reside in the means employed whereby the speed discrepancies between the two forks or drive motors may be indicated by meters, readily computable from certain arbitrary values which have a predetermined relation to the speed departure from the standard set by the speed of the received signal, which is a function of the transmitting rotating mechanism and fork.

A better understanding of the invention may be had from the following detailed description which is accompanied by a drawing wherein Figs. 1 and 2 illustrate two embodiments of the invention in connection with a telegraph receiving station.

Referring to Fig. 1, there is shown a telegraph receiving system employing a drive motor 1 which it is desired to maintain in absolute synchronism with the speed of a drive source at a distant telegraph transmitting station, not shown, from which signals are being received. In general, the telegraph system may be of the type described in United States Patent No. 2,010,505, supra, wherein portions of the rectified received signals are diverted, and the wave front thereof employed to operate a correction unit which, in turn, controls the speed of the drive motor by means of a correction motor.

In the instant case the signals are received over antenna 5, rectified, and passed on to a correction unit 4, to control a correction motor 3 which, in turn, is linked through gears 2 and 6 and shafts 12 and 10 to the field casting of the drive motor 1, the latter, in turn, driving the multiple distributor of the receiving telegraph equipment. Distributor speed is dependent upon the rate of vibration of the synchronizing source, fork 13, and the amount of correction caused by the incoming signals.

Correction unit 4 forms no part of the present invention per se, and will not be described in detail, other than to say that it may be of the type described in either United States Patent No. 2,038,375, granted April 21, 1936, to R. E. Mathes, or copending application Serial No. 708,378, filed January 26, 1934. Any departure from transmitter fork speed of the receiving fork 13 will cause the correction motor 3 to rotate the field casting of the drive motor 1 in such direction as to bring the speed of the distributor shaft in synchronism with the incoming signals. Gears 2 and 6, here shown located in dotted boxes, may have any desired gear ratio, although it is preferred that the ratio of each be of the order of 100 to 1, so that the overall gear ratio between correction motor 3 and drive motor 1 may be somewhere between 5000 and 10,000 to 1. As an illustration the drive motor 1 may revolve at a rate of about 1800 revolutions per minute.

In accordance with the invention, there is provided a drive frequency checking device comprising, in this embodiment, a revolution counter 7 whose total reading will advance or decrease 1 unit whenever the projection 8 carried on the collar 9 attached to the shaft 10, engages any one of the five spokes of the sprocket 11 connected to the counter.

When fork 13 is in exact synchronism with the fork at the distant transmitting station, the correction motor will not move, or if there is a small amount of hunting, due to radio path mutilation the readings on counter 7 will be equal and opposite, so that the net change is zero.

As an illustration of one use of the counter, let us assume that synchronizing fork 13 drives motor 1 at some unknown speed slower than the standard set by the remote transmitter fork, distributor, and signal. As a result, the incoming signal actuates apparatus, 4, 3, 2, 10 and 6, and turns the field of motor 1 in the direction of the distributor shaft rotation so that, although the relative speed between motor armature and motor field remains the same (slower than transmitter shaft), correction applied to the field compensates for the slow shaft speed, the shaft rotating in synchronism with the transmitter shaft while the two controlling forks are vibrating at different rates.

As the action of the correction series 4, 3, 2, 10 and 6 is an expression of the difference between vibration rates of the transmitting and receiving forks, advantage is taken of this function by means of counter 7, which, being operated by the correction mechanism, is also a function of either fork speed discrepancy or shaft speed discrepancy. Taken over a period of time, a reading of counter 7 becomes an indication of speed which shows the amount of correction and direction required to hold shaft synchronism while there is a discrepancy between fork rates. These readings are registered continuously while the radio circuit is on traffic; the only requirement for its use being the establishment of an artitrary period of time over which the reading is taken, to enable the use of a counter reading by reference to a curve, or in a simple mathematical expression representing the particular gearing between the correction and the drive motors and the two points of their utilization.

Fig. 2 disclosed another embodiment of the invention employing an electrical arrangement instead of the mechanical one of Fig. 1. In this figure, wherein the same parts as those of Fig. 1 are represented by the same numerals, an ampere-hour meter M is connected in the power leads of the correction motor and, when calibrated in terms of time, indicates both the sense and amount of speed discrepancy. If desired, the meter can be calibrated to read directly in terms of so many parts per hundred thousand.

What is claimed is:

1. In a telegraph communication system, the method of determining the amount of departure from synchronism between a rotating transmitting mechanism and a remote rotating receiving mechanism which comprises applying, at intervals, mechanical corrections to one of said mechanisms and measuring the value of power necessary to make such corrections.

2. In a telegraph communication system, the method of determining the amount of departure from synchronism between a rotating transmitting mechanism and a remote receiving system which comprises applying, at intervals, mechanical correction to said receiving mechanism and indicating the number of said corrections over an arbitrary period of time.

3. In a telegraph communication system, in combination, a synchronous drive motor, a synchronizing fork for said motor, a correction motor for maintaining the speed of said drive motor in synchronism with a standard, a mechanical link between said two motors comprising a shaft and at least one set of gears between the armature of said correction motor and the field casting of said drive motor, and means for measuring the activity of said correction motor.

4. In a telegraph communication system, in combination, a synchronous drive motor, a synchronizing fork for said motor, a correction motor for maintaining the speed of said drive motor in synchronism with a standard, a mechanical link between said two motors comprising a shaft and at least one set of gears between the armature of said correction motor and the field casting of said drive motor, and a revolution counter attached to said shaft for indicating the number of revolutions thereof.

5. In a telegraph communication system, in combination, a synchronous drive motor, a synchronizing fork for aiding in the control of the speed of said motor, a correction motor for maintaining the speed of said drive motor in synchronism with a standard, a mechanical link between the shaft of said correction motor and the field casting of said drive motor comprising a pair of gear sets each having a ratio of approximately 100:1, and a counter shaft between said gear sets, and a revolution counter for indicating the number of revolutions of said counter shaft, said drive motor having a speed of approximately 1800 R. P. M.

6. In a telegraph communication system, in combination, a synchronous drive motor, a synchronizing fork for aiding in the control of said motor, a correction motor for maintaining the speed of said drive motor in synchronism with a standard, a mechanical link between said two motors comprising a shaft and at least one set of gears between the armature of said correction motor and the field casting of said drive motor, and an electrical indicating instrument conneected in the power leads of said correction motor for indicating the departure from synchronism of said synchronizing fork from said standard.

7. In a telegraph communication system, in combination, a synchronous drive motor, a synchronizing fork for controlling said motor, a correction motor, a correction motor for maintaining the speed of said drive motor in synchronism with a standard, a mechanical link between said two motors comprising a shaft and at least one set of gears between the armature of said correction motor and the field casting of said drive motor, and an electrical indicating instrument connected in the power leads of said correction motor for indicating the departure from synchronism of said drive motor from said standard.

8. Apparatus in accordance with claim 7, characterized in this that said instrument is an ampere-hour meter.

RAYMOND D. HUTCHENS.